Feb. 13, 1962  B. D. MARSHALL ET AL  3,020,748
DEVICE FOR USE IN DETERMINING GEL FORMING TIME OF BLOOD
Filed May 18, 1959  2 Sheets-Sheet 1

INVENTORS
BRUCE D. MARSHALL
HARRY C. EHRMANTRAUT
BY
Boykin, Mohler & Wood
ATTORNEYS Feb. 13, 1962   B. D. MARSHALL ET AL   3,020,748
DEVICE FOR USE IN DETERMINING GEL FORMING TIME OF BLOOD
Filed May 18, 1959   2 Sheets-Sheet 2
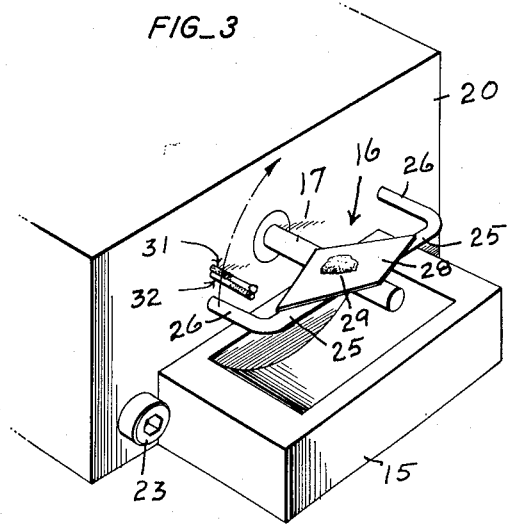
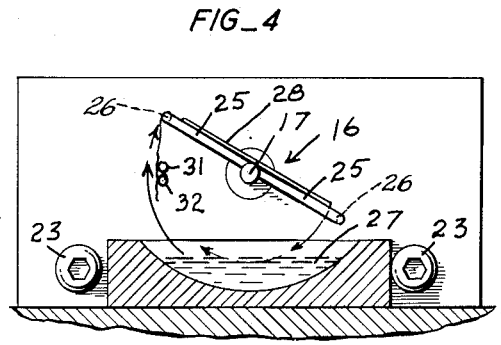
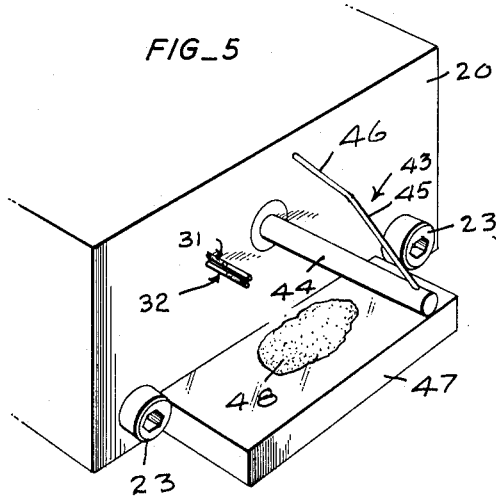
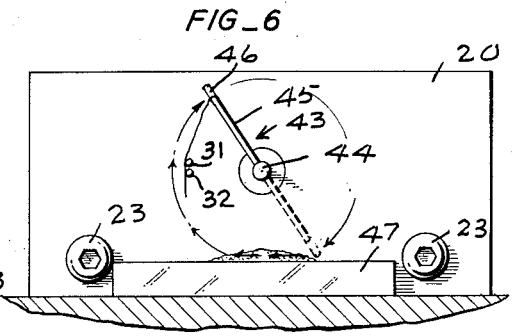
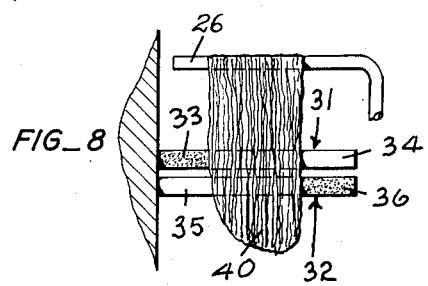
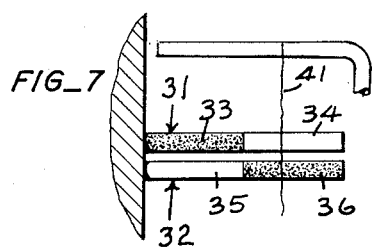
INVENTORS
BRUCE D. MARSHALL
HARRY C. EHRMANTRAUT
BY
Boylan, Mohler & Wood
ATTORNEYS 3,020,748
DEVICE FOR USE IN DETERMINING GEL
FORMING TIME OF BLOOD
Bruce D. Marshall, 936 El Cajon, Palo Alto, Calif., and Harry C. Ehrmantraut, 541 Hawthorne Ave., Los Altos, Calif.
Filed May 18, 1959, Ser. No. 813,916
12 Claims. (Cl. 73—53)

This invention relates to a method and means for use in making tests in which the end point is gel formation: i.e., the two-stage prothrombin test, the prothrombin consumption test, coagulation time determinations, etc., and has for one of its objects the provision of a means and a method for more accurately determining the gel forming time than heretofore.

Another object of the invention is the provision of apparatus that is adapted to automatically make and preserve an accurate record of the clotting time of plasma or blood, so that a technician may start the apparatus, and thereafter the record will automatically be made, which record will be available at any future time until the apparatus is manually reset for making another record.

A still further object of the invention is the provision of apparatus adapted for use in determining the clotting time of blood or plasma, and which apparatus includes means for maintaining the materials of the test at the desired uniform temperature.

At the outset, it is necessary to an understanding of the present invention that it is not concerned with the degree of conductivity of gel or blood clot, or of its character. It is solely concerned with the gel-forming time.

In cases where anti-coagulant drugs are to be administered, it is of vital importance that the clotting time of the plasma be accurately determined, inasmuch as this time is used to determine the level of the dosage to be used. A relatively small error may prove fatal. The prothrombin tests are the tests that are employed for determining the clotting time.

In making a prothrombin test, a mixture of thromboplastin and a calcium salt is added to a specially prepared plasma sample. Heretofore the technician making the test starts a stop watch when the prepared thromboplastin is added to the plasma and the watch is stopped by the technician as soon as he believes, from visual observation, that the clot is forming.

In the above procedure, it is obvious that different technicians have different reflexes, and different vision, and also the light conditions may vary during the day or night. These differences result in different findings. Seldom are the results from tests made by several technicians of the same plasma in agreement.

One of the objects of the present invention is the provision of a means and method that produce accurate results, free from human error.

In determining the coagulation time of whole blood, it is not usually as essential that the time be as accurately determined as in the prothrombin test. However, the greater the degree of accuracy, the greater the safety of the patient. The coagulation time, as distinguished from the clotting time in the prothrombin test, is normally obtained before a surgical operation so the operating surgeon will have full knowledge of any variations from normal that would be dangerous to the patient.

An object of the present invention is the provision of apparatus and method that are adapted to provide an adequate and highly accurate indication of the coagulating time for whole blood, as well as the clotting capacity of the blood in the prothrombin test.

Other objects and advantages will appear in the description and in the drawings.

In the drawings, FIG. 1 is a top plan view of the apparatus that may be employed for carrying out the method.

FIG. 3 is a fragmentary, isometric, view of the portion of the apparatus where the plasma and reagent are mixed and where the clotting takes place in making the prothrombin test.

FIG. 4 is a part sectional, part elevational view of the portion shown in FIG. 3.

FIG. 5 is a view similar to that of FIG. 3 showing the apparatus of FIG. 4 adapted for use in determining the coagulating time of blood.

FIG. 6 is an end view of the portion shown in FIG. 5, but with the rotor indicated in a position in which a thread or strand of coagulated blood is in engagement with the electrodes.

FIG. 7 is an enlarged, fragmentary view illustrating the formation of a single thread in the apparatus of FIG. 1.

FIG. 8 is an enlarged, fragmentary view similar to that of FIG. 7 illustrating the formation of a true clot of many threads and their relation to the electrodes.

Figure 1:
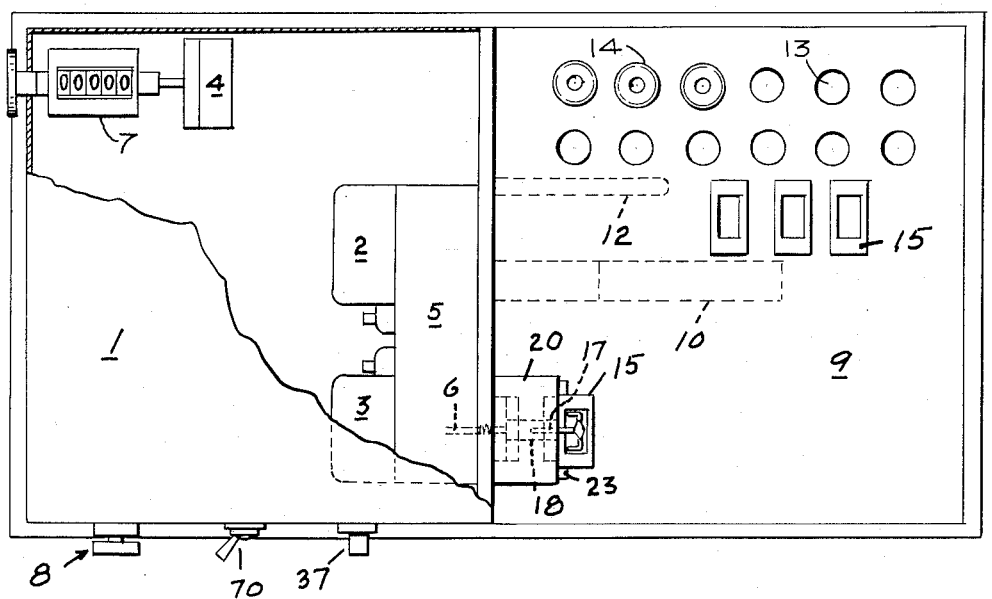

In detail, the apparatus illustrated comprises a housing 1 that may enclose the electrical system that includes synchronous 60 cycle motors 2, 3, 4. Through a suitable clutch and gearing, in case 5 upon motor 2 being energized, a driven rotor shaft 6 is rotated at a speed of say 60 r.p.m., and upon motor 3 being energized the shaft 6 will be driven at say 10 r.p.m. These examples are practical ones preferably used in actual practice, although it is to be understood that the invention is not restricted to these speeds.

Standard duo-motors comprising motors 2, 3 and 5 including the clutch and gear arrangement therein connected with a driven shaft 6 are old and are well known in the industry, hence the clutch and gear arrangement are not illustrated. Such units are for driving a shaft, such as shaft 6, at different speeds according to which motor is energized.

Motor 4 is connected with the timer 7 and the latter is adapted to register tenths of seconds when the motor is actuated. A selector switch 8 is adapted to close the circuit to either motor 2 or motor 3 as desired, and upon closing the circuit to either of the motors 2, 3, the circuit for motor 4 will be closed.

A warming plate 9 is part of the apparatus and is adjacent to the housing 1. An electric heating element 10 is disposed within or adjacent to the plate 9 for heating it, and in the circuit with the heating element is a thermostat 12 that controls the element so as to maintain the plate at a uniform temperature; in the present instance of approximately 37° C.

The circuit for the heating element may be separate from that for the motors 2, 3, 4 since this heating circuit may be constantly maintained under the control of the thermostat.

Plate 9 may be provided with a plurality of upwardly opening recesses 13 in which individual tubes 14, containing plasma, may be supported so that the temperature of the plasma will be approximately 37° C. or the same as the temperature of the plate 9.

The plate 9 is also adapted to support thereon metal cups 15 each of which is formed with an upwardly opening recess of substantially cylindrical contour developed about a horizontal axis above each cup. Each cup 15 is preferably of metal and nickel plated so there will be no reaction due to the contact between the plasma and thromboplastin and the metal, since each of these cups is to hold the plasma sample and the thromboplastin during the test. The cups 15 will be heated to the same temperature as that of plate 9.

Figure 9:
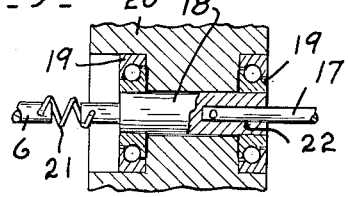
FIG. 9 is an enlarged fragmentary view partly in section and partly in elevation, showing the flexible coupling that connects the rotors of FIG. 3 or 5 with the motor driven shaft, and the view shows the bearings and mount for the rotor shafts.

In conducting a prothrombin test, a special rotor, generally designated 16 (FIG. 3) is preferably used. This rotor includes a shaft 17 that is adapted to be releasably connected with the driven shaft 6 by means of a very accurately mounted cylindrical coupling 18 (FIG. 9) that is supported at its opposite ends, for rotation, in precision aligned coaxial ball bearings 19 that are mounted in a bore formed in a block 20. Block 20 is secured to housing 1 or to plate 9, in a position with the coupling 18 as closely aligned as is reasonably possible with the shaft 6, and a flexible coupling 21, such as a rubber tube, helical spring or the like, will connect the coupling 18 with shaft 6 for driving the coupling.

Shaft 17 is adapted to be frictionally and releasably held in the bore 22 of coupling member 18, by any suitable means.

Shaft 17 projects laterally, or horizontally over plate 9 from one side of the vertical side of block 20, and which block may also carry a pair of horizontally spaced projections 23 (FIG. 4) between which a cup 15 is adapted to be positioned, with the axis about which the cylindrical contour of the recess in the cup is developed, being vertically above and parallel with the axis of shaft 17.

Secured to shaft 17 and projecting radially outwardly therefrom at two opposite sides thereof are a pair of arms 25 (FIG. 3). The outer end portions 26 of said arms extend toward block 20 and are parallel with shaft 17, and are equally spaced from the latter.

The lengths of portions 26 of arms 25 are slightly less than the width of the recess of cup 15. The plate 9 is adapted to support a cup 15 in a position in which the portions 26 at the outer ends of arms 25 will be carried into the cup for complete immersion in a body 27 of plasma and thromboplastin at each revolution of shaft 17. These portions 26 will not engage the inner surface of the recess in which body 27 is held, and preferably the axis or center line about which the cylindrical surface of the recess is developed is spaced above the axis of shaft 17, but in the same vertical plane with the latter.

Secured on one side of the shaft 17 and disposed in a plane that is parallel with the plane in which arms 25 are disposed, is a flat plate 28 of generally diamond outline although this plate could have a generally wedge shaped outline, as will appear. The opposite acute angle pointed ends of plate 28 point in the same directions as the arms 25 extend from shaft 17, and the other two obtuse angle points or corners are in a line parallel with and over the axis of shaft 17. This plate may be of any suitable material, but is preferably of nickel plated metal to provide a smooth, polished upper surface on which a sample 29 of the prepared plasma is adapted to be placed and supported when the plate is uppermost and horizontal as seen in FIG. 3.

In the view shown in FIGS. 3, 4 the rotor, which includes shaft 17 and arms 25, is rotatable in a clockwise direction, and offset to the left of shaft 17 at substantially the same level as the latter is a pair of horizontally elongated, straight, parallel electrodes 31, 32 extending from block 20 and parallel with shafts 6, 17. These electrodes are positioned with electrode 31 slightly spaced above electrode 32 (FIG. 7), and they are supported by block 20 to be just inside the circular path of end portions 26 of arms 25 when the rotor is actuated.

One half 33 of electrode 31 is electrically insulated on its outer surface while the other half 34 is bare. The half 35 of electrode 32 that is alongside the insulated portion 33 of electrode 31 is bare, while the remaining half 36 of electrode 32 that is alongside the bare half of electrode 34 is electrically insulated in the same manner as the portion 33. The lines of division between the bare and insulated portions of electrodes 31, 32 are in a common plane that is perpendicular to the electrodes, although there may be a very slightly overlapping of the insulated portions so that a single thin conductor that might be positioned exactly on the dividing line or in said plane would not establish a connection between the bare portions.

These electrodes are in the circuit with the motors 2, 3, 4 and which circuit includes means for breaking the circuit to the motors upon the establishment of a current across the bare portions of the electrodes, as will appear in the schematic electrical diagram.

In making a prothrombin test, the blood to be tested is centrifuged in the usual manner to obtain the plasma, and samples of the plasma are placed in the tubes 14, where the test is to be made promptly. Otherwise they should be placed under refrigeration.

The metal cups 15 are prewarmed on the plate 9 so as to also be at a temperature of substantially 37° C.

The operator, in a typical operation for each test, will pipette 0.2 cc., of prepared thromboplastin and dispose it in a pre-warmed cup 15 which is then positioned between the positioning projections 23 and against block 20 as seen in FIG. 4, the arms 25 and plate 28 thereon being horizontal. Also 0.1 cc. of plasma 29 will be placed on the plate 28.

The motors 2 and 4 are then started simultaneously by the actuation of a switch 37 and within at least 0.2 of a second the plasma 29 will be discharged off the pointed right hand end of plate 28 into the 0.2 cc. of prepared thromboplastin in cup 15. Preferably the acute angle end of plate 28 over which the plasma is discharged into the cup will extend slightly into the body 27 of plasma and thromboplastin so as to facilitate the complete discharge of the plasma into the thromboplastin as soon as the plate 28 is tilted sufficiently to effect the discharge of the plasma into the cup. Thus it will be seen that the pointed left hand end of plate 28 could be omitted, insofar as the advantage that has been pointed out in having the discharge end of the plate connect with the material in the cup. As shown, however, the rotor is balanced by making the plate symmetrical. The selector switch 8 (FIG. 2) will connect either motor 2 or motor 3 in the circuit.

In the example, the rotor 16 will make one complete revolution each second, therefore one end portion 26 on each arm 25 will be passed through the body 27 in the cup 15 each half second, thereby gently mixing the plasma and prepared thromboplastin. In this connection it is important to note that a substantially greater speed of the rotor or a more rapid agitation of the body 27, such as might occur were three or four arms on the rotor, would result in retarding the normal clotting time and would result in a false reading.

The rate of travel of the portions 26 of arms 25 at a speed of 60 r.p.m. of the rotor is preferably approximately 50 inches per minute as a maximum and the elapsed time from the moment each portion 26 enters the body 27 until it is directly opposite to the space between the electrodes 31, 32 is approximately one half second. The cup 15 and arm 25 are proportioned to produce approximately the above results, which are necessary for obtaining an accurate reading.

It should also be emphasized that a close control of the clearance between the rotor portions 26 and the electrodes contributes to the accuracy of the end-point detection this clearance being so slight that gel, when formed, and carried upwardly from body 27 by either arm 26 will bridge the space between the electrodes when the arm reaches a point opposite to said space, but otherwise the sample will not bridge said space. Once the clot or gel is formed and is lifted from the cup, it is applied across the electrodes in the minimum time.

Also, it is important that the cup and rotor expose minimal surface area of the mixture while permitting the rotor to traverse the maximum volume of the mixture as seen in FIG. 4 in which the body 27 is horizontally elongated and is traversed from end to end.

One of the occurrences that heretofore has caused error in estimating the clotting time has been the formation of one or two spurious threads or filaments in advance of the true clotting time. When the true clotting occurs, it is relatively abrupt.

Electrodes 31, 32 being in a circuit with motors 2, 4 are in combination with other control elements in said circuit to effect a stopping of the motors the instant a true clotting of the plasma occurs so that the mass of threads 40 (FIG. 8), which is a conductor, establishes an electrical connection across the bare portions 34, 35 of electrodes 31, 32.

Where one thread or several spurious threads 41 (FIG. 7) is or are formed, such thread or threads will not be adequate to establish an electrical connection between the electrodes, since they will not connect the bare portions of the electrodes, hence the motors will continue until true clotting occurs.

Once the motors 2, 4 have stopped, the timer 7 will also stop and will indicate, in tenths of a second, substantially the exact elapsed time between the moment the plasma was discharged into the reagent, and the time that clotting occurred, and this elapsed time may be read at any later period, since the timer will remain unchanged until it is reset for another operation.

The normal clot forming time will vary with individuals, but usually occurs within twelve to fifteen seconds after the plasma enters the prepared thromboplastin. However, as has been previously mentioned, the elapsed time between the start of the apparatus and the gel forming time will be accurately determined within a range that is approximately 0.5 of a second. Should the clot commence to form immediately after one arm 26 has left the body 27 the second arm will enter the body 27 and will pass electrodes in approximately 0.6 of a second. Inasmuch as the clotting time is relatively abrupt, in the event clotting occurs while the portion 26 is at substantially any point within the body 27, sufficient threads will be carried to the electrodes to establish an electrical connection between them.

In FIGS. 5, 6 a slightly different rotor 43 is shown, which is adapted to replace rotor 16 and this form of the invention is intended mainly for use in determining the coagulation time of whole blood.

Figure 2:
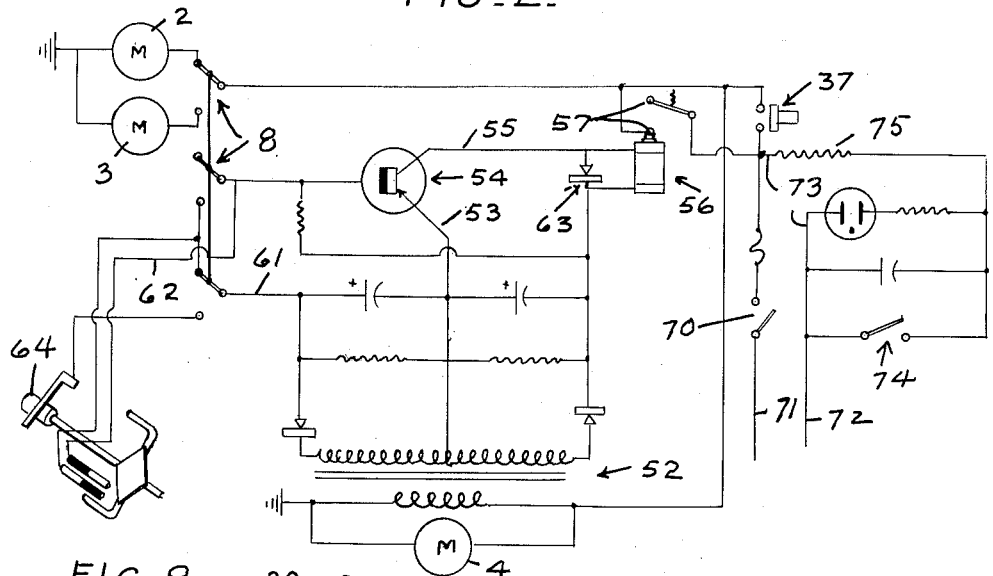
FIG. 2 is a schematic wiring diagram of the electrical system employed.

In this form of the invention, the rotor shaft 6 is in a closed circuit with both of the electrodes when a single thread or filament is formed, as will be seen from the electrical circuit (FIG. 2). The coagulation time is properly established when a thread is formed, hence the interval between the actuation of switch 37 for closing the circuit to motors 3 and 4 and the establishment of a current between either of the electrodes 31, 32, which will result in the motors stopping, will be the coagulation time.

The rotor 43 in the present instance has a shaft 44 similar to shaft 17, but it carries only one arm 45, which is a spring arm capable of flexing. This arm has an end portion 46 that is slanted or inclined with respect to the shaft 44. The support for the blood specimen may comprise a glass or plastic block 47 having a flat, hard, polished, horizontal upper surface of low heat conductivity on which the blood sample 48 (FIGS. 5, 6) is adapted to be positioned. This block may have the same length as cup 15, hence will be adapted to be positioned between projections 23 the same as cup 15.

As has been mentioned, the outer end portion 46 of arm 45 is slanted relative to the shaft 44. This slant is such that the outermost end of portion 46 will engage the upper surface of the block 47 at one end of the specimen 48 and as the rotor continues to rotate (clockwise in FIGS. 5 and 6), the end portion 46 will progressively bend toward a position parallel with the upper surface of the block and said end portion will follow a substantially straight linear path of travel through the specimen 48 from one end to the other, but only the outermost end will engage the upper surface of the block during this travel through the specimen.

The motor 3 is a relatively slow speed motor, as compared with motor 2, as has already been mentioned, and the arm 46 will make approximately two and a half revolutions per minute. This is because the time for coagulation of the blood is relatively long as compared with the clotting time in the prothrombin test. As soon as a strand forms in the blood it will be stretched to engage the electrodes and the motors 3, 4 will stop. The timer will indicate and maintain the amount of the time interval until it is reset. Where motor 3 is energized, the rotor functions as one electrode and either of the other electrodes functions as the other so that the motors will stop when one or more threads are formed.

Referring more specifically to the schematic wiring diagram of FIG. 2, upon pressing the start button or switch 37, the timer motor 4 will start and simultaneously therewith either motor 2, or motor 3 will be energized, according to the position of the switch 8.

Assuming that motor 2 is energized to make a prothrombin test, the switch 8 will be in the position shown in FIG. 2 so that motor 3 will be de-energized but motor 2 will be energized.

The closing of switch 37 will result in current being supplied to the primary coil of the step-down transformer 52. The low voltage output of the transformer is rectified, one-half of the D.C. potential being applied to the circuit 53 of the transistor 54. The collector current 55 of the transistor activates relay 56 closing contacts 57 in parallel with the switch 37. The circuit is self sustaining in this condition, and motors 2, 4 will continue to operate until the circuit is broken.

Immediately upon a mass of fibers 40 (FIG. 8) connecting the bare portions 34, 35 of electrodes 31, 32 the circuit 61, 62 (FIG. 2) in the outer half of the transformer secondary circuit will be completed, thus imposing positive bias on the base of the transistor 54, thereby abruptly cutting off the collector current, and de-energizing the relay 56. Thus the transistor constitutes a switch. The diode 63 in the relay coil circuit produces a rapid collapse of the electromagnetic field of the coil, allowing the contacts to open with negligible delay. The motors 2, 4 will stop immediately, and thereafter the elapsed time between the depositing of the plasma into the thromboplastin and the clotting time may be read from the timer 7.

While FIGS. 4 and 8 show arm 26 in a position above the electrodes 31, 32, the gel indicated actually bridges the space between said electrodes to establish a circuit between them when arm 26 is opposite the space between them due to the very small clearance between the path of travel of arms 26 and the electrodes.

When merely a blood clotting test is to be made the switch 8 is moved to connect motor 3 in the circuit and to disconnect motor 2 and the rotor armature 64 (FIG. 2) will be connected with the secondary circuit 61 and a single strand of clotted blood 41 (FIG. 7) engaging either of the bare ends of electrodes 31, 32 will function to cut off the collector current to the relay 56 and motors 3, 4 will be de-energized.

In its simplified form it will be apparent that the electrically actuated timer and rotor are in a first electrical circuit in which the establishment of a current in a second circuit by connecting the open terminals or electrodes with the clotted specimen actuates a switch in said first circuit for de-energizing the circuit to the two motors. While the two motors should start at the same time, the most important thing is that the timer motor should stop as soon as possible after the clot is formed.

This circuit arrangement provides a high degree of sensitivity to the end point to be detected, at the same time assuring maximum reliability through discrimination against vibration and other sources of spurious information that heretofore have resulted in serious errors. The circuit also enables the operator to permit the device to automatically complete the sequence of operation unattended, once the device is started. The particular reaction time that is being investigated is available from the electric timer 7 at any subsequent time after the operation is over.

The device and method hereinbefore described are applicable to a variety of tests in which the end point is gel formation, i.e., the two-stage prothrombin test, the prothrombin consumption test, coagulation time determinations, etc.

The use of the term "gel forming time of blood" in the claims is intended to include the clotting or coagulation time in any test in which the measurement of the blood clotting capacity or time of an individual is to be determined. The word "blood" includes plasma, as in a prothrombin test.

As is seen in FIG. 2 the closing of the switch 70 in the incoming power circuit 71, 72 will energize the heating circuit 73 in which the thermo-switch 74 and the heater 75 are connected, and this circuit will remain energized until switch 70 is opened. Thus the heating plate 9 will remain at the desired temperature irrespective of the actuation of motors 2, 3 and 4.

We claim:

1. A device for measuring the gel forming time of a blood sample comprising; a rotor motor and a rotor connected therewith for rotation thereby upon actuation of said rotor motor, a timer motor and a recording timer connected therewith for rotation thereby to record the period of time of actuation of said timer by said timer motor, a receptacle for a fluid such as a blood sample, said rotor including a shaft rotatable about its axis upon actuation of said motor and an arm extending generally longitudinally of said shaft spaced radially therefrom and connected with said shaft for revolving about the latter in a circular path and in a vertical plane when said shaft is rotated, means for supporting said receptacle in a position for movement of said arm in one direction into said receptacle and through such blood sample when the latter is in said receptacle during the movement of said arm at its lowermost position in said path whereby gel formed from said sample will be lifted from said receptacle suspended from said arm for movement of said gel in a circular path substantially corresponding with that of said arm, a pair of spaced electrodes in said path of such gel during said upward movement thereof for connection by such gel upon said gel being carried to said electrodes, an electrical circuit including said electrodes, said rotor motor and said timer motor, a switch in said circuit for simultaneously closing the latter for causing simultaneous actuation of said motor rotor and said timer motor, said circuit including means for discontinuing flow of current to said timer motor actuatable by connecting said electrodes by said gel whereby the gel forming time of said sample will be measured and recorded.

2. A device for measuring the gel forming time of a blood sample comprising; a rotor motor and a rotor connected therewith for rotation thereby upon actuation of said rotor motor, a timer motor and a recording timer connected therewith for rotation thereby to record the period of time of actuation of said timer by said timer motor, a receptacle for a fluid such as a blood sample, said rotor including a shaft rotatable about its axis upon actuation of said motor and an arm extending generally longitudinally of said shaft spaced radially therefrom and connected with said shaft for revolving about the latter in a circular path and in a vertical plane when said shaft is rotated, means fixed relative to said shaft for supporting said receptacle in a position for movement of said arm in one direction into said receptacle and through such blood sample when the latter is in said receptacle during the movement of said arm at its lowermost position in said path whereby gel formed from said sample will be lifted from said receptacle suspended from said arm for movement of said gel in a circular path substantially corresponding with that of said arm, a pair of vertically spaced electrodes in said path of such gel during said upward movement thereof for connection by such gel upon said gel being carried to said electrodes, an electrical circuit including said electrodes, said rotor motor and said timer motor, a switch in said circuit for simultaneously closing the latter for causing simultaneous actuation of said motor rotor and said timer motor, said circuit including means for discontinuing flow of current to said timer motor actuatable by connecting said electrodes by said gel whereby the gel forming time of said sample will be measured and recorded, said electrodes having bare portions laterally offset relative to each other extending to and substantially adjoining said vertical plane at opposite sides thereof whereby a plurality of threads of said gel will be required to make an effective connection between said electrodes.

3. A device for measuring the gel forming time of a blood sample comprising; a rotor motor and a rotor connected therewith for rotation thereby upon actuation of said rotor motor, a timer motor and a recording timer connected therewith for rotation thereby to record the period of time of actuation of said timer by said timer motor, a receptacle for a fluid such as a blood sample, said rotor including a shaft rotatable about its axis upon actuation of said motor and an arm extending generally longitudinally of said shaft spaced radially therefrom and connected with said shaft for revolving about the latter in a circular path and in a vertical plane when said shaft is rotated, means below and fixed relative to said rotor for supporting said receptacle in a position below said rotor for movement of said arm in one direction into said receptacle and through such blood sample when the latter is in said receptacle during the movement of said arm at its lowermost position in said path whereby gel formed from said sample will be lifted from said receptacle suspended from said arm for movement of said gel in a circular path substantially corresponding with that of said arm, a pair of spaced electrodes in said path of such gel during said upward movement thereof for connection by such gel upon said gel being carried to said electrodes, an electrical circuit including said electrodes, said rotor motor and said timer motor, a switch in said circuit for simultaneously closing the latter for causing simultaneous actuation of said motor rotor and said timer motor, said circuit including means for discontinuing flow of current to said timer motor actuatable by connecting said electrodes by said gel whereby the gel forming time of said sample will be measured and recorded, said means for supporting said receptacle in said position being a plate, means rigidly connecting said plate with said motor, and means fixed relative to said shaft for positioning said receptacle in its said position for movement of said arm into said receptacle and through such blood sample means for heating said plate and for maintaining it at a uniform temperature whereby said receptacle and the blood sample therein will be maintained at said temperature.

4. A device for measuring the gel forming time of a blood sample comprising; a first, uniform speed synchronous rotor motor and a rotor connected therewith for rotation thereby at a predetermined uniform rate of speed upon actuation of said rotor motor, a timer motor and a recording timer connected therewith for rotation thereby to record the period of time of actuation of said timer by said timer motor, a receptacle for a fluid such as a blood sample, said rotor including a shaft rotatable about its axis upon actuation of said motor and an arm extending generally longitudinally of said shaft spaced radially therefrom and connected with said shaft for revolving about the latter in a circular path and in a vertical plane when said shaft is rotated, means for supporting said receptacle in a position for movement of said arm in one direction into said receptacle and through such blood sample when the latter is in said receptacle during the movement of said arm at its lowermost position in said path whereby gel formed from said sample will be lifted from said receptacle suspended from said arm for movement of said gel in a circular path substantially corresponding with that of said arm, a pair of spaced electrodes in said path of such gel during said upward movement thereof for connection by such gel upon said gel being carried to said electrodes, an electrical circuit including said electrodes, said rotor motor and said timer motor, a switch in said circuit for simultaneously closing the latter for causing simultaneous actuation of said motor rotor and said timer motor, said circuit including means for discontinuing flow of current to said timer motor actuatable by connecting said electrodes by said gel whereby the gel forming time of said sample will be measured and recorded, said rotor motor having a shaft and said rotor being releasably secured on said shaft to enable substitution of different types of rotors, and a second uniform speed synchronous motor connected with said shaft for driving said shaft at a different rate of speed than said first synchronous motor.

5. A device for measuring the gel formng time of a blood sample comprising; a rotor motor and a rotor connected therewith for rotation thereby upon actuation of said rotor motor, a timer motor and a recording timer connected therewith for rotation thereby to record the period of time of actuation of said timer by said timer motor, a receptacle for a fluid such as a blood sample, said rotor including a shaft rotatable about its axis upon actuat'on of said motor and an arm extending generally longitudinally of said shaft spaced radially therefrom and connected with said shaft for revolving about the latter in a circular path and a vertical plane when said shaft is rotated, means for supporting said receptacle in a position for movement of said arm in one d'rection into said receptacle and through such blood sample when the latter is in said receptacle during the movement of said arm at its lowermost position in said path whereby gel formed from said sample will be lifted from said receptacle suspended from sa'd arm for movement of said gel in a circular path substantially corresponding with that of said arm, a pair of spaced electrodes in said path of such gel during said upward movement thereof for connection by such gel upon said gel being carried to said electrodes, an electrical circuit including said electrodes, said rotor motor and said timer motor, a switch in said circuit for simultaneously closing the latter for causing simultaneous actuation of said motor rotor and said t'mer motor, said circuit including means for discontinuing flow of current to said timer motor actuatable by connectng said electrodes by said gel whereby the gel forming time of said sample will be measured and recorded, said rotor motor having a shaft and said rotor being releasably secured on said shaft to enable substitution of different types of rotors, and means other than said rotor motor for driving said shaft at a different rate of speed than said motor, said last mentioned means comprising a second motor and means for connecting said second motor with said shaft and for discontinuing actuation of sa'd rotor motor.

6. In a device for determining the gel forming time of a blood sample, including a horizontally extending shaft supported for rotation about its axis, a shaft actuating electric motor connected with said shaft for rotat'ng it, a pair of arms extending generally longitudinally of said axis and equally spaced from said shaft at opposite sides of the latter for revolving in a vertical plane in a common circular path about said axis upon rotat'on of said shaft, a recording timer, a receptacle for such sample having an open upper side through which said arms are adapted to move during revolution thereof, means for supporting said receptacle spaced below said shaft for movement of said arms therethrough and through a sample in said receptacle at their lowest point in said path whereby gel of said sample will be lifted from said receptacle on one of said arms during said revolution of said arms upon such gel being formed, an electrical timer motor connected with said recording timer for actuating the latter, an electrical circuit in which said shaft actuating motor and said timer motor are connected for simultaneous actuation upon current being supplied thereto in sa'd circuit, current control means positioned and supported in a fixed position adjacent to said path and in the path of gel carried by said arms for engagement by gel so carried upon the formation thereof in said receptacle and the movement of said arms out of the blood sample in said receptacle, and means actuated by said engagement of said gel with said current control means for d'scontinuing current in said circuit to said timer motor and shaft actuating motor during actuation of said motors for discontinuing actuation thereof for actuating said ime recorder and said shaft actuating motor, and means connected with said shaft for movement therewith for supporting a blood clotting agent there'n and for discharging said agent into a sample in said receptacle substantially immediately upon current in said circuit being supplied to said motors for actuation of the latter.

7. A device for measuring the gel forming time of a blood sample comprising: a member supported for movement in a predetermined path, a support for a blood sample, means supporting said support in a position for movement of said member through and past a blood sample on sa'd support for carrying gel of said sample on said support and along said path upon the formation of said gel, an electrically actuated timer adapted to record the time period of its actuation, an electric motor connected with said member for moving the latter along said path at a uniform rate of speed, an electrical circuit in which said timer and said motor are connected and a switch in said circuit actuatable for simultaneous closing said circuit to said motor and said timer for simultaneously starting and actuating them by current in said circuit, electrical conductor, means including an electrode supported a predetermined distance from said support and closely adjacent to said path, for engagement with gel carried by said member when formed from a blood sample on said support, and electrically actuated means in said circu't connected with said conductor means actuatable by said engagement of gel carried on said member from said blood sample with said electrode for discontinuing current in said circuit to said timer for thereby discont'nuing actuation of said timer.

8. A device for measuring the gel forming time of a blood sample comprising: a member supported for movement in a predetermined path, a support for a blood sample, means supporting said support in a position for movement of said member through and past a blood sample on said support for carrying gel of said sample on said support and along said path upon the formation of said gel, an electrically actuated timer adapted to record the time period of its actuation, an electric motor connected with said member for moving the latter along said path at a uniform rate of speed, an electrical circuit in which said timer and said motor are connected and a switch in said circuit actuatable for simultaneous closing said circuit to said motor and said timer for simultaneously starting and actuating them by current in said circuit, electrical conductor means including an electrode supported a predetermined distance from said support and closely adjacent to said path, for engagement with gel carried by said member when formed from a blood sample on said support, and electrically actuated means in said circuit connected with said conductor means actuatable by said engagement of gel carried on said member from said blood sample with said electrode for discontinuing current in said circuit to said timer for thereby discontinuing actuation of said timer, a carrier for supporting a clotting agent to be mixed with said sample over said support and connected with said member for discharge of such agent from said carrier and into a sample on said support upon initial movement of said member in said path when said switch is closed.

9. A device for measuring the gel forming time of a blood sample comprising: a member supported for movement in a predetermined path, a support for a blood sample, means supporting said support in a position for movement of said member through and past a blood sample on said support for carrying gel of said sample on said support and along said path upon the formation of said gel, an electrically actuated timer adapted to record the time period of its actuation, an electric motor connected with said member for moving the latter along said path at a uniform rate of speed, an electrical circuit in which said timer and said motor are connected and a switch in said circuit actuatable for simultaneous closing said circuit to said motor and said timer for simultaneously starting and actuating them by current in said circuit, electrical conductor means including an electrode supported a predetermined distance from said support and closely adjacent to said path, for engagement with gel carried by said member when formed from a blood sample on said support, and electrically actuated means in said circuit connected with said conductor means actuatable by said engagement of gel carried on said member from said blood sample with said electrode for discontinuing current in said circuit to said timer for thereby discontinuing actuation of said timer, said first mentioned means for supporting said support including a plate removably supporting said support thereon in heat transfer relation thereto, and heating means connected with said plate for heating the latter to a uniform predetermined temperature for thereby heating said support at said temperature when the latter is supported on said plate.

10. A device for measuring the gel forming time of a blood sample comprising: a gel carrying member, means supporting said member for movement in a circular path disposed in a vertical plane, a support for a blood sample, means for positioning and for supporting said support below said member for passage of said member at the lowermost portion of said path through a blood sample when the latter is supported on said support whereby gel of said sample will be carried upwardly by said member from said support when said gel is formed, an electrically actuated timer, an electrical motor connected with said member for moving the latter in said path at a uniform rate of speed, an electrical circuit in which said timer and said motor are connected for actuation by current in said circuit, and a switch in said circuit closing the latter to flow of current to said timer and motor for simultaneously actuating said timer and motor, electrical conductor means in said circuit engageable with gel on said carrier at a point in the upward movement of said member and electrically actuatable means in said circuit actuatable upon engagement of said gel with said conductor means for discontinuing current in said circuit to said timer for thereby discontinuing actuation of said timer.

11. A device for measuring the gel forming time of a blood sample comprising: a gel carrying member, means supporting said member for movement in a closed path of travel disposed in a vertical plane, a support for a blood sample, means for positioning and for supporting said support below said member for passage of said member at the lower portion of said path through a blood sample when the latter is supported on said support whereby gel of said sample will be carried upwardly by said member from said support when gel is formed, an electrically actuated timer and an electrical motor connected with said member for moving the latter in said path at a uniform rate of speed, an electrical circuit in which said timer and said motor are connected for actuation by current in said circuit, and a switch in said circuit for closing the same to flow of current to said timer and motor for simultaneously actuating said timer and motor, a pair of spaced electrodes in said circuit, positioned closely adjacent to said path for connection by gel carried upwardly by said member moving past said electrodes, and electrically actuatable means in said circuit upon electrodes being so connected by said gel for discontinuing current in said circuit to said timer for thereby discontinuing actuation of said timer.

12. A device for measuring the gel forming time of a blood sample comprising: supporting means for supporting a blood sample thereon, gel carrying means supported for intermittent movement at equally spaced intervals and at a uniform rate of speed through a blood sample on said supporting means and along a predetermined path of travel extending away from such blood sample, positioning means for positioning and supporting said supporting means in a position for said movement of said gel carrying means through a blood sample on said supporting means, mounting means supporting said gel carrying means for said movement thereof, time recording means actuatable for recording the duration of movement of said gel carrying means, electrically actuated power means respectively connected with said gel carrying means and with said time recording means for actuating said gel carrying means for said movement thereof and for actuating said time recording means to record the time duration of movement of said gel carrying means, an electrical circuit connected with said electrically actuated power means for supplying current to the latter for actuation thereof and a switch in said circuit for closing the latter to simultaneously actuate said power means, electrical conductor means connected with said circuit, means positioning and supporting said electrical conductor means at a point alongside said path for engagement with gel carried on said gel carrying means when said gel is formed in a blood sample on said supporting means, and means in said circuit electrically actuatable upon said engagement of said gel with said electrical conductor means for discontinuing movement of said time recording means.

References Cited in the file of this patent

UNITED STATES PATENTS

| | | |
|---|---|---|
| 2,312,488 | Rowland | Mar. 2, 1943 |
| 2,478,785 | Shapiro | Aug. 9, 1949 |